US009447612B2

(12) United States Patent
Oakley et al.

(10) Patent No.: US 9,447,612 B2
(45) Date of Patent: Sep. 20, 2016

(54) DUAL FUNCTION POWER DOOR

(71) Applicant: Honda Motor Co., Ltd., Minato-ku, Tokyo (JP)

(72) Inventors: Michael D. Oakley, Jerome City, OH (US); Craig T. Kline, Bellefontaine, OH (US); Dean A. Scott, Jr., Marysville, OH (US); Hideaki Arai, Powell, OH (US); Joseph P. Whinnery, Marysville, OH (US); Saeed Namakydoost, Powell, OH (US); Yoshitomo Ihashi, Utsunomiya (JP); Trevor Scott Whitten, East Liberty, OH (US); Makoto Watanabe, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/520,177

(22) Filed: Oct. 21, 2014

(65) Prior Publication Data

US 2015/0033630 A1 Feb. 5, 2015

Related U.S. Application Data

(63) Continuation of application No. 13/569,409, filed on Aug. 8, 2012, now Pat. No. 8,872,447.

(51) Int. Cl.
*H02P 1/54* (2006.01)
*E05B 81/74* (2014.01)
(Continued)

(52) U.S. Cl.
CPC ............... *E05B 81/74* (2013.01); *B22C 15/20* (2013.01); *E05B 41/00* (2013.01); *E05B 81/56* (2013.01); *E05F 15/20* (2013.01); *E05F 15/40* (2015.01); *E05Y 2400/356* (2013.01);
(Continued)

(58) Field of Classification Search
CPC ................................. E05B 81/74; H02P 5/74
USPC ...................................................... 318/62, 34
See application file for complete search history.

(56) References Cited

U.S. PATENT DOCUMENTS 4,333,269 A 6/1982 Bascou
4,999,551 A 3/1991 Yoshida et al.
(Continued)

FOREIGN PATENT DOCUMENTS

CN 101506457 A 8/2009
DE 19813025 A1 9/1999
(Continued)

OTHER PUBLICATIONS

International Search Report and Written Opinion dated Oct. 25, 2013 for Application No. PCT/US2013/053900.
(Continued)

*Primary Examiner* — David S Luo
(74) *Attorney, Agent, or Firm* — Arent Fox LLP

(57) ABSTRACT

A system and method for controlling an automatic operation of a power door of a vehicle is presented. An actuation of an interior switch by a user is detected and, upon detecting the actuation of the interior switch, whether at least one door of the vehicle is locked is determined. When the at least one door of the vehicle is locked, whether a vehicle security is set is determined. When the at least one door of the vehicle is locked and the vehicle security is set, the automatic operation of the power door is prohibited. When the at least one door of the vehicle is not locked or the vehicle security is not set, the automatic operation of the power door is permitted.

26 Claims, 5 Drawing Sheets

(51) Int. Cl.

| | |
|---|---|
| ***B22C 15/20*** | (2006.01) |
| ***E05F 15/40*** | (2015.01) |
| ***E05B 41/00*** | (2006.01) |
| ***E05B 81/56*** | (2014.01) |
| ***E05F 15/20*** | (2006.01) |

(52) U.S. Cl.

CPC ....... *E05Y 2400/53* (2013.01); *E05Y 2400/59* (2013.01); *E05Y 2400/814* (2013.01); *E05Y 2400/86* (2013.01); *E05Y 2800/00* (2013.01); *E05Y 2800/11* (2013.01); *E05Y 2800/424* (2013.01); *E05Y 2800/73* (2013.01); *E05Y 2900/531* (2013.01); *E05Y 2900/546* (2013.01); *Y10T 70/625* (2015.04)

(56) References Cited

U.S. PATENT DOCUMENTS

| | | | |
|---|---|---|---|
| 5,111,902 | A | 5/1992 | Sundeen et al. |
| 5,885,922 | A | 3/1999 | Hibst et al. |
| 5,982,126 | A | 11/1999 | Hellinga et al. |
| 6,254,148 | B1 | 7/2001 | Cetnar |
| 6,411,054 | B1 | 6/2002 | Van Wiemeersch |
| 6,583,715 | B1 | 6/2003 | Benzie et al. |
| 6,588,829 | B2 | 7/2003 | Long et al. |
| 6,847,289 | B2 * | 1/2005 | Pang ..................... B60R 25/246 307/10.1 |
| 6,879,247 | B2 * | 4/2005 | Shimomura ........ B60R 25/1004 340/426.16 |
| 6,993,423 | B2 | 1/2006 | Inman et al. |
| 7,034,485 | B2 | 4/2006 | Kuan et al. |
| 7,151,350 | B2 | 12/2006 | Haag et al. |
| 7,224,262 | B2 | 5/2007 | Simon et al. |
| 7,586,280 | B2 | 9/2009 | Warren et al. |
| 7,688,179 | B2 | 3/2010 | Kurpinski et al. |
| 7,761,209 | B2 | 7/2010 | Morris et al. |
| 7,937,893 | B2 | 5/2011 | Pribisic |
| 8,022,808 | B2 * | 9/2011 | Kurpinski ............. B60R 25/246 340/425.5 |
| 8,872,447 | B2 | 10/2014 | Oakley et al. |
| 2004/0020126 | A1 | 2/2004 | Matsui et al. |
| 2004/0046418 | A1 | 3/2004 | Chikata et al. |
| 2004/0123525 | A1 | 7/2004 | Suzuki et al. |
| 2007/0132273 | A1 | 6/2007 | Suzuki et al. |
| 2009/0085720 | A1 | 4/2009 | Kurpinski et al. |

FOREIGN PATENT DOCUMENTS

| | | | |
|---|---|---|---|
| DE | 102010001263 | A1 | 7/2011 |
| EP | 1116850 | A2 | 7/2001 |

OTHER PUBLICATIONS

Chinese Office Action dated Nov. 30, 2015 issued in Chinese Patent Application No. 201380042314.1.

* cited by examiner

DUAL FUNCTION POWER DOOR

CROSS-REFERENCE TO RELATED APPLICATIONS

This application is a continuation of and claims priority to U.S. patent application Ser. No. 13/569,409 (now U.S. Pat. No. 8,872,447) entitled "DUAL FUNCTION POWER DOOR" and filed on Aug. 8, 2012.

FIELD OF THE INVENTION

The disclosure relates in general to a system and method for controlling a vehicle power door and, more particularly, to a system and method for providing a dual-function power door selectable between a manual and a power mode of operation,

BACKGROUND OF THE INVENTION

Many vehicles include power doors to facilitate their opening and closing by a user. Power doors incorporate electric servos or motors that are configured to transition the door from its open state to its closed state, and vice versa. In some cases, the power doors also allow for a manual operation in which the electric servos or motors are disabled.

In general, the power doors allow a simple user action, such as the pressing of a button on a key fob, or lifting of a door handle, to initiate the power door opening or closing process. When a user's hands are otherwise occupied, these power doors greatly facilitate the user's access into the vehicle. Often, for example, the power doors are integrated in the vehicle's tailgate or liftgate to assist in opening when a user is carrying shopping bags or luggage to the vehicle.

Although the power doors can be very useful to the user, in some cases, the automatic operation of power doors can be undesirable. When the vehicle is parked in a relatively tight space, or under a low overhang, for example, the power doors could open directly into objects surrounding the vehicle causing damage. This problem can be even more apparent when the vehicle incorporates a passive entry system. In that case, the key fob is never activated. Instead, the user simply approaches the vehicle and uses a handle to open the door or liftgate. If the door or liftgate always employs its power door operation, the door may open automatically, even when the user wishes to open the door manually.

SUMMARY OF THE INVENTION

The disclosure relates in general to a system and method for controlling a vehicle power door and, more particularly, to a system and method for providing a dual-function power door selectable between a manual and a power mode of operation.

In one implementation, the present invention is a method of controlling an operation of a power door of a vehicle. The method includes detecting an activation of a user interface device associated with the power door, and providing a cue using a notification device after detecting the activation of the user interface device. When the user interface device is activated for greater than a predetermined time period, the method includes causing the power door to be in a power mode of operation, and using the notification device to indicate a current operational mode of the power door.

In another implementation, the present invention is a method of controlling an automatic operation of a power door of a vehicle. The method includes detecting an actuation of an interior switch by a user, and, after detecting the actuation of the interior switch, determining if a vehicle security is set. If the vehicle security is set, the method includes prohibiting the automatic operation of the power door. If the vehicle security is not set, the method includes permitting the automatic operation of the power door.

In another implementation, the present invention is a system for controlling an operation of a power door of a vehicle. The system includes a sensor for detecting an activation of a user interface device associated with the power door, a motor controller configured to control a movement of the power door, and a notification device. The system includes a processor configured to use the sensor to detect the activation of the user interface device associated with the power door, after detecting the activation of the user interface device associated with the power door, provide a cue using the notification device, and, when the user interface device is activated for greater than a predetermined time period cause the power door to be in a power mode of operation, and notify the user of a current operational mode of the power door using the notification device.

DETAILED DESCRIPTION OF THE DRAWINGS

The disclosure relates in general to a system and method for controlling a vehicle power door and, more particularly, to a system and method for providing a dual-function power door selectable between a manual and a power mode of operation.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Figure 2:
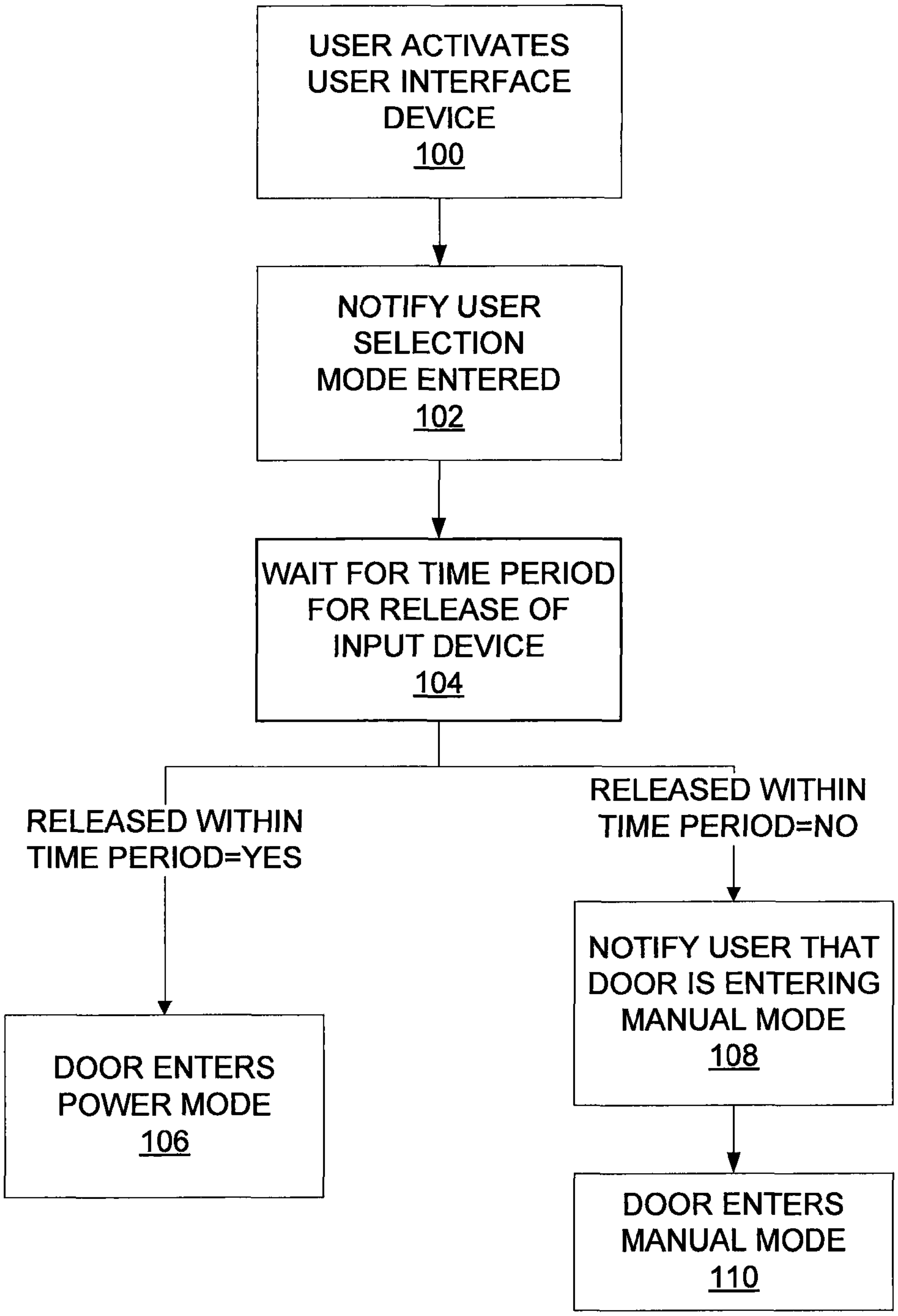
FIG. 2 is a flowchart showing a method implemented by the power door control system for controlling a powered or manual operation of a power door.

The schematic flow chart diagrams included are generally set forth as logical flow-chart diagrams (e.g., FIG. 2). As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In conventional power door mechanisms, the power doors only allow for rudimentary control over the door's operation. In most cases, using a key fob button, door handle, button connected to the door handle, or other user interface device, a user can initiate the automatic operation of the power door. Although this operation can be useful (e.g., for a user carrying luggage or shopping), the automatic operation can sometimes be undesirable. When the vehicle is parked in a relatively tight space, or under a low overhang, for example, the power doors could open directly into objects surrounding the vehicle, causing damage. This problem can be even more apparent when the vehicle incorporates a passive entry system. In that case, the key fob is never activated directly. Instead, the user simply approaches the vehicle and uses a handle to open the door. If the door or liftgate always employs its power door operation, the door may open automatically, even when the user wishes to open the door manually.

Although some conventional systems allow a user to select between a manual and automatic operation of a power door, those systems generally require that the user employ different activation mechanisms to select between the manual and power modes of operation, where a first activation mechanism always results in a manual operation, while a second activation mechanism always results in a power operation. For example, a power door may always operate in manual mode when the door handle is used. To place the power door into power mode, the user may be required to activate a particular button on a key fob. Accordingly, it can be difficult or impossible for the user to select between the powered and manual operation using the same input device, be it a handle, key fob button, or input device mounted to the vehicle.

The present system and method incorporates a user feedback cue that enables the user to provide a timed input to a controller of or associated with a power door. The timed input determines the power door's mode of operation—either powered or manual—and can be provided using a single interface device (e.g., a door handle, key fob switch, button, and the like). The present system and method may be incorporated into any vehicle door incorporating a powered actuator, such as an electric motor, for opening and closing a door on the vehicle. Suitable doors include conventional car doors, tailgates, liftgates, sliding doors, and the like.

In one implementation, this user's input is provided via a door handle in response to an audible cue provided by the vehicle. At the time of door handle activation, the user relies upon an audible cue provided by the system to deliver a time-dependent input to the door handle allowing for a selection between the powered and manual modes of operation of the power door. Depending upon when the user's input is provided (e.g., by releasing the handle at a particular time, or maintaining the handle in its raised position), the present power door control system selects between the manual or power modes of operation of the power door.

In other implementations of the present system, depending upon the user input or other condition existing about or in the vehicle, the user and/or the present power door control system can also control the opening distance of the power door. For example, a keyless entry fob for the vehicle can be used to identify a driver as he or she approaches the vehicle. Depending upon the identification of the driver, the power door will open to a saved or predetermined opening distance associated with that key fob.

Alternatively, the vehicle may determine that it is parked within a garage due to a recent activation of a garage door or other opener or activation device connected to the vehicle, in which case the power door may open by a smaller distance than during normal operation to prevent the door from contacting an interior surface of the garage. In one implementation, a recent activation is one that occurred within the last 60 seconds.

The power door may also incorporate one or more sensors that are configured to sense obstructions to the power door and can cause movement of the power to be limited to minimize damage thereto.

The present system operates by providing the user with one or more cues, which may comprise audible cues. In other implementations, though, the cues may include visual or tactile cues, or combinations of audible, visual, and tactile cues. In response to the cues, the user provides an input to one of the doors of the vehicle (e.g., through the door's handle). Depending upon when that input occurs in relation to the audible cue, the door will operate in either an automatic or a manual mode. The present system can be used to control the operation of any power door of a vehicle, including power doors, power tailgates, power liftgates, sliding doors, and the like.

The present system may be used to control the operation of a power door when the door is transitioning from a closed position to an open position, from an open position to a closed position, or between two pre-determined positions. Generally, the present system and method allow for controlling whether a power door enters an automatic powered mode, or a manual mode of operation irrespective of what the automatic powered mode entails. In general, the present disclosure is presented in terms of a user opening a power door, though throughout the disclosure the 'power mode' of operation should be understood to encompass any mode of operation of the power door involving automatic or powered movement.

In one example operation of the system, a user first pulls upon the handle of a power door of a vehicle. After detecting the handle pull, the power door controller provides an audible cue (e.g., a beep) to indicate to the user that the door has entered a user-input mode, though other cues, as described above, may be utilized. If the user releases the handle within a specified time period (e.g., 1 second), the system causes the door to enter an automatic, powered mode, wherein the power door will open automatically.

In contrast, if the user continues the hold the handle in the activated state beyond that specified time period (e.g., 1 second), the system will provide a second audible cue (e.g., two or more beeps) indicating that the door has entered a manual mode of operation. At that time the user can release the handle or continue holding the handle. In either case, the user can then operate the door manually.

These various operational modes are illustrated in Table 1.

TABLE 1

| Handle Operation: | Audible Cue: |
|---|---|
| AUTOMATIC DOOR MODE | |
| Pull and Release in less than 1 second | Single cue at time handle is initially activated |
| MANUAL DOOR MODE | |
| Pull and Hold for greater than 1 second | Cue at time of handle activation and after handle is held for longer than 1 second |

As shown in Table 1, to enter the automatic, or power, door mode, the user must pull and release the door handle within a 1 second period of time. If that is accomplished, the system will generate only a single cue that occurs at the time the handle was first pulled. After the 1 second period of time has elapsed, the door enters power mode and will automatically open.

Alternatively, to cause the power door to enter the manual mode, the user must both initially pull upon the door handle and also hold the door handle in that pulled state for a period of time exceeding the predetermined 1 second. If that is accomplished the system will generate an initial cue when the handle is initially pulled. The system will also generate a second cue after the handle has been held in the pulled state for a period of time exceeding 1 second, In one implementation, the second cue is outputted by the power door control system immediately following the expiration of that 1 second time period.

Table 1 shows only one potential implementation of the present power door control system. In various other implementations, the time period for determining whether the door will enter a power or manual mode of operation may be adjusted. For example, the time period may be adjusted based upon the identity of a key fob detected to be in close proximity to the vehicle. If, for example, a first individual's key fob is detected to be closest to the vehicle, the time period may be set to a first duration. If, however, a second key fob is detected (e.g., belonging to a second driver), then the time period may be set to a second duration.

Similarly, the number and type of cues can be adjusted based upon desired system operation. For example, the number and type of cues may be selected based upon an identity of a key fob detected to be in close proximity to the vehicle. If, for example, a first individual's key fob is detected to be closest to the vehicle, the cues may be configured to include both audible and visual cues. Alternatively, if a second key fob is detected (e.g., belonging to a second driver), then the cues may be limited to only audible cues.

In various implementations of the present system, one or more of the audible cues may be replaced by any other user notification device or system, such as a flashing light (e.g., produced by a light emitting diode (LED)), a vibrator mounted within the door handle, or a combination thereof. Similarly, rather than base the mode selection on the user's manipulation of a door handle, other user input devices can be used to control whether a particular door enters and automatic or manual mode of operation. For example, a button on the vehicle's key fob may be used to provide the timed user input of the present system. Alternatively, a button, switch, touch, or pressure sensor may be incorporated into, or mounted nearby, one or more of the vehicle's power doors allowing the user to provide the desired input.

Figure 1:
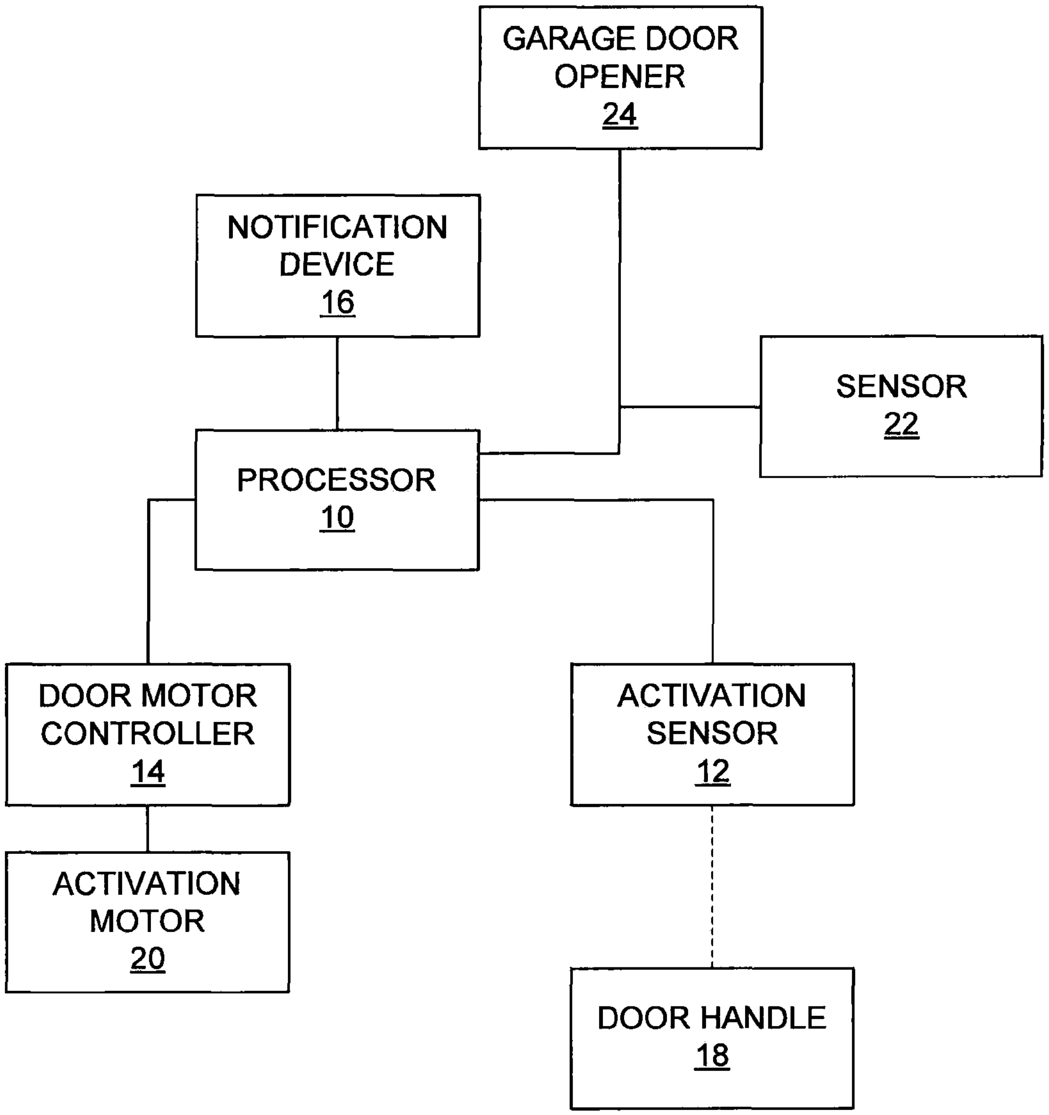
FIG. 1 is a block diagram illustrating components of a power door control system.

FIG. 1 is a block diagram illustrating components of the power door control system. The system includes processor 10 that is connected to activation sensor 12, door motor controller 14, and notification device 16. Activation sensor 12 is, in turn, connected to a mechanical user interface such as a button, touch sensor device, or, as shown in FIG. 1, door handle 18.

Activation sensor 12 is configured to detect an activated or deactivated status of the user interface device, such as door handle 18, and report that status to processor 10. In the case of door handle 18, the handle's activated status occurs when the handle is lifted, and the handle's deactivated status occurs when the handle is lowered.

Door motor controller 14 is connected to activation motor 20. Activation motor 20 is mounted within the vehicle's power door and is configured to control a movement of motor 20 to allow for a powered movement of the associated door.

During operation of the system, processor 10, using activation sensor 12, detects that a user has activated door handle 18. In other applications, though, activation sensor 12 is configured to instead detect the user's contact with any surface of the door or the vehicle, a pressing of the vehicle's key fob, etc.

Upon detecting that the user has activated door handle 18 (or other user interface device), processor 10 signals a cue to the user to indicate that the door has entered a selection mode allowing the user to select either powered or manual operation. That cue is delivered to the user via notification device 16. Notification device 16 can include an audible alarm (e.g., a buzzer), a visual cue (e.g., LEDs, liquid crystal display screen, etc.), visual alarm, or other notification device.

In response to the cue, the user may provide a second, timed, input to door handle 18, which is detected by activation sensor 12. That detection is then passed to processor 10. Depending upon when the timed input occurs (or, in fact, if it does not occur), processor 10 selects a mode of operation of the door, may issue notification of the same to the user via notification device 16, and instructs door motor controller 14 accordingly. Depending upon the algorithm being implemented by processor 10, a number of audible cues may be provided to the user using notification device 16 to guide the user through the mode selection process.

In various other implementations, processor 10 may utilize information from additional connected sensors (e.g., sensor 22) to identify a particular key fob in proximity to the vehicle. Alternatively, processor 10 can be configured to interact with garage door opener 24 to attempt to determine whether the vehicle has recently entered a garage. Information collected from sensor 22 or garage door opener 24 may be further utilized by processor 10 to refine the operation of the power door, for example, by providing specific instructions to door motor controller 14. Both sensor 22 and garage door opener 24 are may, in some implementations, be omitted from the present power door control system.

FIG. 2 is a flowchart showing a method implemented by the present system for controlling a powered or manual operation of a power door. In step 100, the user activates a user interface device associated with the power door (e.g., handle 18 of FIG. 1). In one implementation, the device includes the door's outer handle, but in other implementations the device may include any of the door's handles, key fob buttons, touch surfaces, or combinations thereof.

In step 102, the system (e.g., via processor 10 of FIG. 1) notifies the user that the system has entered a selection mode allowing the user to select between a powered or manual operation of the door. This notification may be audible (e.g., via notification device 16), or can be visual, or combinations thereof.

After notifying the user in step 102, the system waits for a first predetermined time period for the user to release the user input device step 104. For example, the system may wait for the user to release the door handle.

If the interface device is released or deactivated within the predetermined time period, the door enters power mode in step 106. For example, referring to FIG. 1, processor 10 may, in that case, instruct door motor controller 14 to instruct activation motor 20 to automatically operate the door.

While the door is operating in power mode, an additional activation of the interface device can further modify the behavior of the door. For example, if the interface device is activated while the door is operating in power mode (either during opening or closing), the door will stop moving and hold in place. If the interface device is then released within a predetermined time period, the door will enter into a power mode moving in the opposite direction. Accordingly, if the door was originally opening in a power mode, the activation and subsequent deactivation of the interface device within the time period will cause the door to enter a power closing mode. If, however, the interface device is held for greater than the predetermined time period, the door will enter into a manual mode of operation allowing the user to manually control the position of the door.

Returning to FIG. 2, when the interface device is not released within the predetermined time period, the system first informs the user that the door is entering a manual mode in step 108. The notification may be audible (e.g., a series of beeps), or can be made via one or more other notification devices. After notifying the user that the door is entering manual mode, the door enters manual mode in step 110.

In some implementations, when entering automatic mode, the system may use data gathered from additional sensors or systems within the vehicle to make a further determination as to how far to open a particular door. For example, at step 106 of FIG. 2, the system may interrogate the surroundings (and interior) of the vehicle to identify a closest key fob (e.g., using sensor 22 of FIG. 1).

After identifying the closest key fob, the system may determine whether that key fob is associated with a preferred door-opening distance (e.g., a first driver of a vehicle may prefer that the door only be opened by a small distance, while a second driver may prefer that the door be opened a relatively long distance). If a preferred door-opening distance is identified, in step 106 the power door motor controller may be instructed to cause the door to only open by that distance.

Alternatively, in step 106 the system may determine whether a garage door associated with the vehicle has been recently activated (e.g., by interrogating garage door opener 24 of FIG. 1). If so, the system may determine that the vehicle has been parked in a garage and may, therefore, limit the distance by which the door can be opened. This limitation may be applied regardless of the identification of nearby key fobs. Alternatively, this limitation may only be applied if certain key fobs are found to be in proximity to the vehicle.

Figure 3:
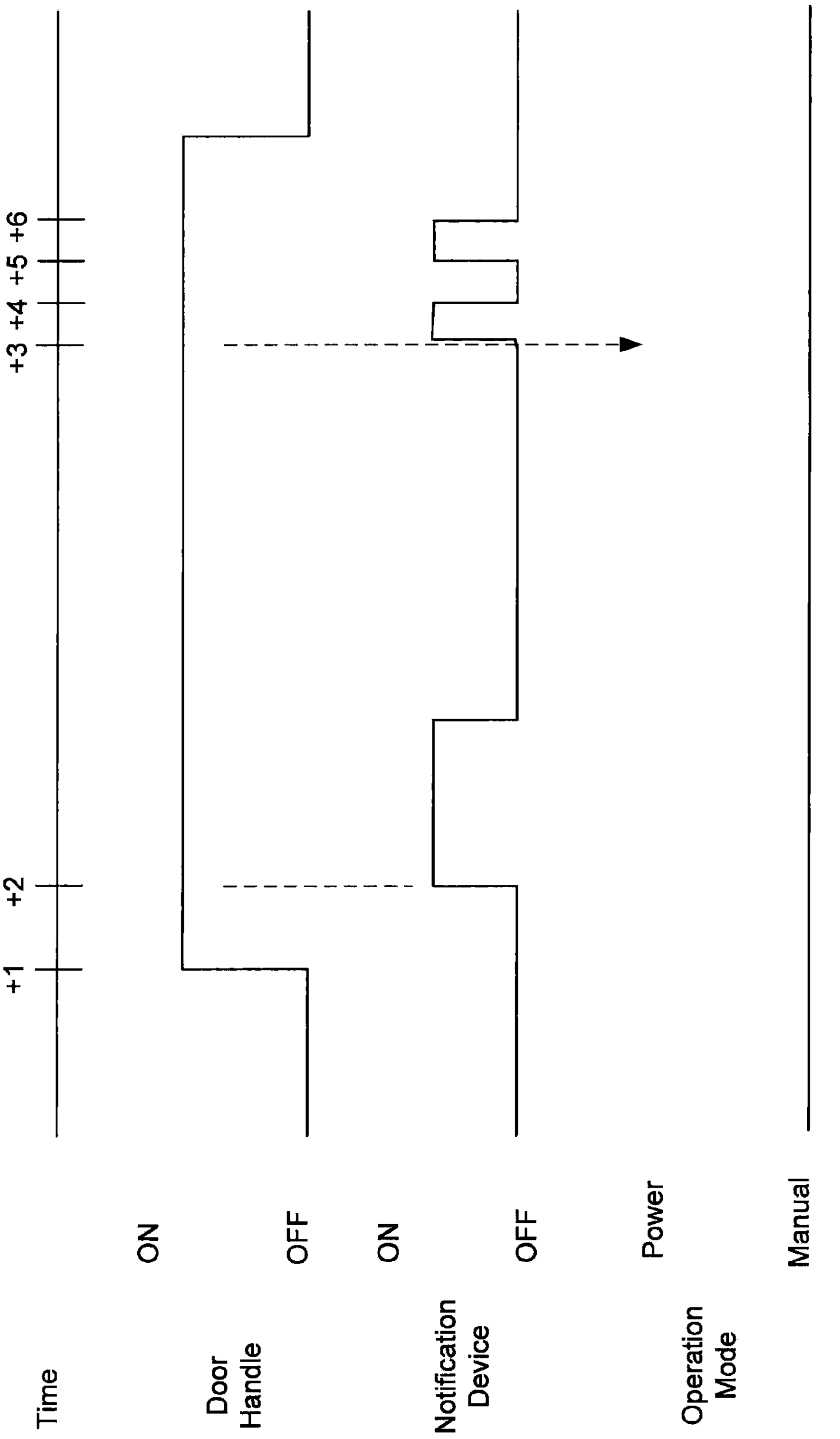
FIG. 3 is a timing diagram illustrating a state of components of the power door control system when implementing the method of FIG. 2 to cause the door to enter a manual mode.

FIG. 3 is a timing diagram illustrating the state of various components of the present system when implementing the method in FIG. 2 to cause the door to enter a manual mode. FIG. 3 shows the status of the door handle (e.g., door handle 18 of FIG. 1), the user notification device (e.g., notification device 16 of FIG. 1), and the current mode of operation of the door.

Referring to FIG. 3, at time t=+1 the user activates the door handle. In one implementation, door handle activation is detected when the door handle is raised. Following a short de-bounce period (e.g., approximately 35 milliseconds (ms)), the system activates the notification device at time t=+2, for example, by sounding a buzzer. In one implementation, the buzzer lasts 600 ms. This buzzer notifies the user that the door has entered a selection mode allowing the user to select between a manual and a powered operation of the door.

Following a pre-determined time frame (e.g., 1000 ms), the system, at time t=+3 determines that the user has continued to hold the door handle throughout the predetermined time period. At that time, the system causes the door to enter a manual mode of operation. As shown in FIG. 3, the manual mode may be the default mode of operation of the door. Also, at that time, the system uses the notification device to notify the user that the door has entered manual mode. As shown in FIG. 3, the notification may include beeps sounded at times t=+3 and +5.

Figure 4:
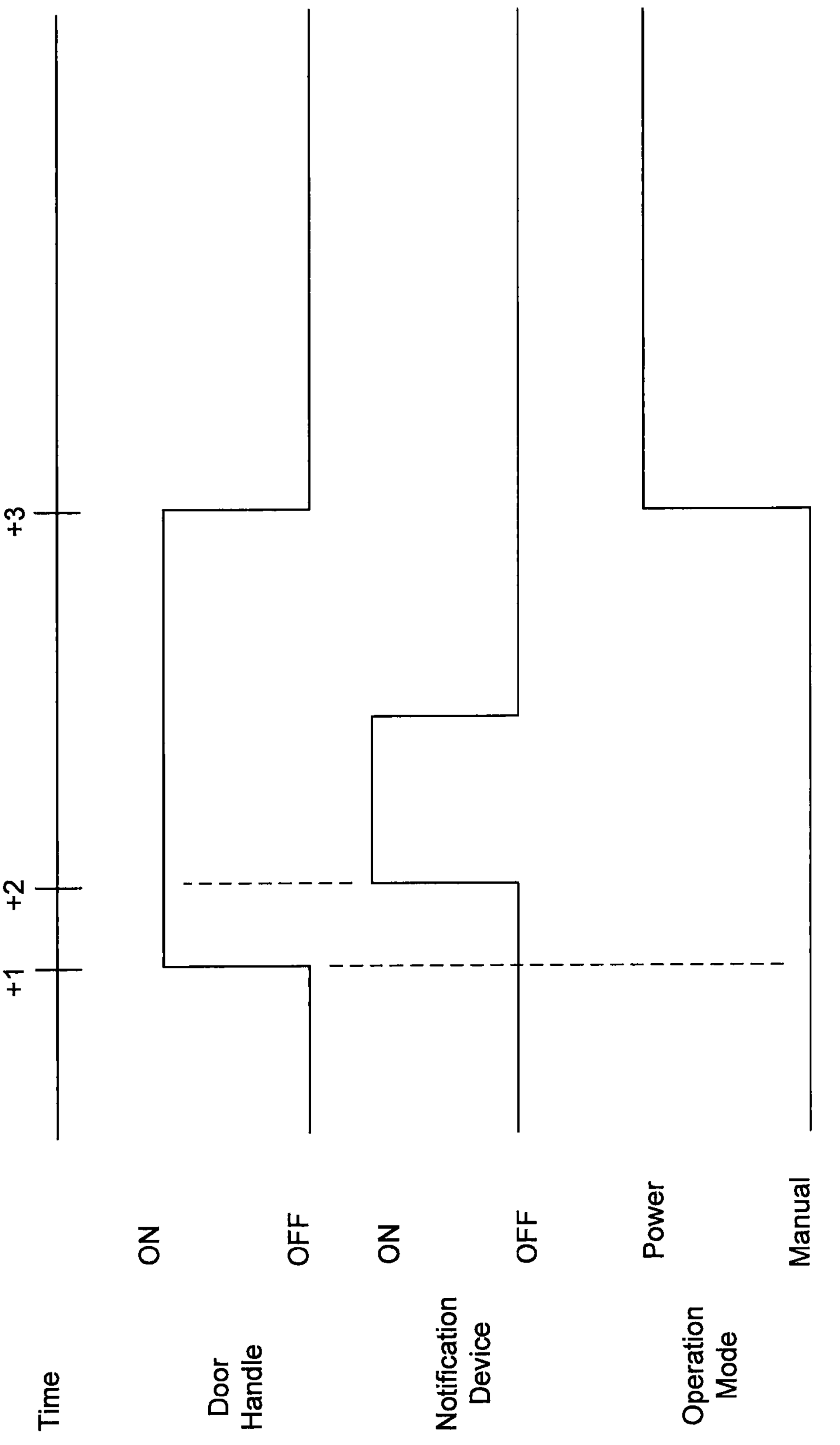
FIG. 4 is a timing diagram illustrating the state of components of the power door control system when implementing the method in FIG. 2 to cause the door to enter a power or automatic mode.

FIG. 4 is a timing diagram illustrating the state of various components of the present system when implementing the method in FIG. 2 to cause the door to enter a power mode. FIG. 4 shows the status of the door handle (e.g., door handle 18 of FIG. 1), the user notification device (e.g., notification device 16 of FIG. 1), and the current mode of operation of the door.

At time t=+1 the user activates the door handle. In one implementation, door handle activation is detected when the door handle is raised. Following a short de-bounce period (e.g., approximately 35 ms), the system activates the notification device at time t=+2, for example, by sounding a buzzer. In one implementation, the buzzer lasts approximately 600 ms. This buzzer notifies the user that the door has entered a selection mode allowing the use to select between a manual and a powered operation of the door.

The system then waits for a pre-determined time frame (e.g., approximately 1000 ms) to determine whether the user has continued to hold the door handle. However, in this example, at time t=+3 the user releases the door handle. At that time (t=+3), the system causes the door to enter a power mode and causes the power door's motor controller to move the door automatically. In some implementations, the notification device is used to notify the user that the door has entered power mode.

In some implementations, the power door control system can include interior user inputs, as opposed to the exterior user inputs described above (such as door handle 18, key fob button, or other exterior buttons, switches, touch sensors, or pressure sensors), for engaging automatic operation of one or more power doors from inside the vehicle. For example, the vehicle can include a power tailgate that allows automatic opening of the rear tailgate or hatch by actuation of an interior dash or driver switch. The interior dash switch can be connected to the processor 10 of FIG. 1 so that, in response to an actuation of the interior dash switch, the processor 10 can instruct door motor controller 14 to instruct activation motor 20 to automatically operate the rear tailgate.

Conventionally, vehicles include an interlock system that does not allow actuation of the interior dash switch to engage automatic opening of the rear tailgate when any vehicle door is locked, for example in order to prevent inadvertent access into the vehicle through the rear tailgate or hatch. More specifically, this interlock system can prevent a car thief from gaining access to the vehicle by simply inserting an object into the vehicle compartment and activating the tailgate switch, While helpful, this security countermeasure can create an undesired functional limitation for a driver in some instances. For example, many vehicles automatically lock all of the doors when the driver shifts into drive or when a certain driving speed has been reached. If the driver were to then pull over to load cargo, all doors must first be unlocked before actuation of the interior dash switch will open the rear tailgate.

Some implementations of the present system permit automatic tailgate operation via actuation of the interior dash switch even if one or more vehicle doors are locked. In order to maximize functionality without compromising the security of the vehicle, the system (e.g., processor 10), can first determine whether any vehicle doors are locked and, if any vehicle doors are found to be locked, can perform a secondary check of the security status of the vehicle. If the vehicle's security is set, automatic operation of the tailgate is prohibited. However, if the vehicle's security is not set, the tailgate can be operated regardless of whether any vehicle doors are locked. The vehicle's security can be considered set when the vehicle doors have been locked remotely (e.g., with a key fob lock button) or manually via a universal door lock switch (e.g., a switch located near the driver that locks all vehicle doors when actuated). With more information from the additional security check, the system can make a more accurate judgment of the vehicle condition in order to maximize functionality of the power tailgate without compromising the security of the vehicle driver's possessions.

Figure 5:
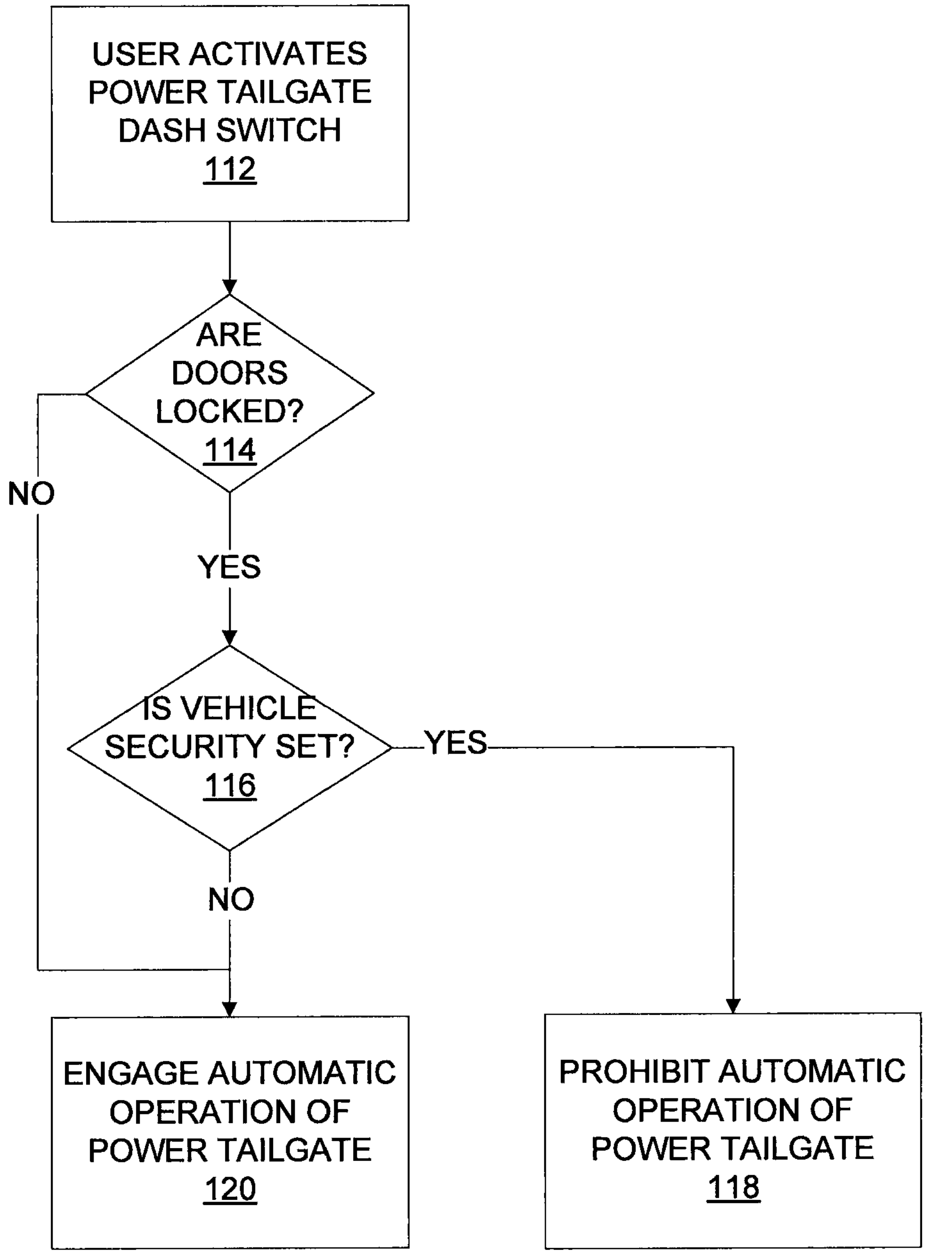
FIG. 5 is a flowchart showing a method implemented by the power door control system for controlling automatic operation of a power tailgate.

FIG. 5 is a flowchart showing an example method implemented by the present system for controlling automatic operation of the power tailgate. In step 112, the user activates the interior dash switch. In step 114, the system determines whether any vehicle doors are locked. If any vehicle doors are locked, the system proceeds to step 116 and determines if the vehicle's security is set. If the vehicle's security is set, the system proceeds to step 118 and prohibits operation the power tailgate. If the system determines that all vehicle doors are unlocked or that the vehicle's security is not set at step 114 or step 116, respectively, the system proceeds to step 120 and engages or permits automatic operation of the power tailgate (e.g., permits opening of the rear tailgate). In some implementations of the system, the method described above with reference to FIG. 5 can be applied to other power doors of the vehicle that include interior switches or user inputs for actuating automatic operation of the power doors.

In addition, in some implementations, the system can permit or prohibit automatic tailgate operation by only checking the vehicle's security status, rather than first checking if the vehicle doors are locked, and then checking the vehicle's security status only if any of the vehicle doors are locked. For example, in some vehicles, the status of the vehicle's door locks can be inferred from checking the vehicle's security status. For this reason, in some implementations of the system, the step of checking vehicle door locks, as described above, can either be eliminated completely or can be inherently performed when the system checks the security status of the vehicle.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A method of controlling an automatic operation of a power door of a vehicle, comprising:
- detecting an actuation of an interior switch by a user;
- upon detecting the actuation of the interior switch, determining whether at least one door of the vehicle is locked;
- when the at least one door of the vehicle is locked, determining whether a vehicle security is set;
- when the at least one door of the vehicle is locked and the vehicle security is set, prohibiting the automatic operation of the power door;
- when the at least one door of the vehicle is not locked or the vehicle security is not set, permitting the automatic operation of the power door; and
- when the at least one door of the vehicle is not locked or the vehicle security is not set and when a recent activation of a garage door opener is detected, limiting a movement of the power door to a predetermined opening distance.

2. The method of claim 1, wherein determining whether the vehicle security is set comprises determining if the at least one door is locked due to actuation of a key fob lock button or actuation of an internal universal door lock switch.

3. The method of claim 1, including:
- identifying a key fob in proximity to the vehicle; and
- identifying the predetermined opening distance using the identification of the key fob.

4. The method of claim 1, including when the at least one door of the vehicle is not locked or the vehicle security is not set, using an audible alarm to notify a user that the power door is in an automatic mode of operation.

5. The method of claim 1, wherein the power door comprises at least one of a tailgate and a liftgate.

6. A method of controlling an automatic operation of a power door of a vehicle, comprising:
- detecting an actuation of an interior switch by a user;
- determining if a vehicle security is set after detecting the actuation of the interior switch;
- prohibiting the automatic operation of the power door if the vehicle security is set;
- permitting the automatic operation of the power door if the vehicle security is not set; and if the vehicle security is not set and when a recent activation of a garage door opener is detected, limiting a movement of the power door to a predetermined opening distance.

7. The method of claim 6, wherein determining if the vehicle security is set comprises determining if the at least one door is locked due to one of actuation of a key fob lock button and actuation of an internal universal door lock switch.

8. The method of claim 6, including:

identifying a key fob in proximity to the vehicle; and identifying the predetermined opening distance using the identification of the key fob.

9. The method of claim 6, including, if the vehicle security is not set, using an audible alarm to notify a user that the power door is in an automatic mode of operation.

10. The method of claim 6, wherein the power door comprises at least one of a tailgate and a liftgate.

11. A system for controlling an operation of a power door of a vehicle, comprising:

a sensor for detecting an activation of an interior switch associated with the power door;

a motor controller configured to control a movement of the power door; and a processor configured to:

detect an actuation of an interior switch by a user;

upon detecting the actuation of the interior switch, determine whether at least one door of the vehicle is locked;

when the at least one door of the vehicle is locked, determine whether a vehicle security is set;

when the at least one door of the vehicle is locked and the vehicle security is set, prohibit the motor controller from moving the power door;

when the at least one door of the vehicle is not locked or the vehicle security is not set, permit the motor controller to move the power door; and when the at least one door of the vehicle is not locked or the vehicle security is not set and when a recent activation of a garage door opener is detected, limit a movement of the power door to a predetermined opening distance.

12. The system of claim 11, wherein the processor is configured to determine whether the at least one door is locked due to actuation of a key fob lock button or actuation of an internal universal door lock switch.

13. The system of claim 11, wherein the processor is configured to:

identify a key fob in proximity to the vehicle; and identify the predetermined opening distance using the identification of the key fob.

14. The system of claim 11, wherein the processor is configured to, when the at least one door of the vehicle is not locked or the vehicle security is not set, use an audible alarm to notify a user that the power door is in an automatic mode of operation.

15. The system of claim 11, wherein the power door comprises at least one of a tailgate and a liftgate.

16. A method of controlling an automatic operation of a power door of a vehicle, comprising:

detecting an actuation of an interior switch by a user;

upon detecting the actuation of the interior switch, determining whether at least one door of the vehicle is locked;

when the at least one door of the vehicle is locked, determining whether a vehicle security is set;

when the at least one door of the vehicle is locked and the vehicle security is set, prohibiting the automatic operation of the power door;

when the at least one door of the vehicle is not locked or the vehicle security is not set, permitting the automatic operation of the power door; and when the at least one door of the vehicle is not locked or the vehicle security is not set, using an audible alarm to notify a user that the power door is in an automatic mode of operation.

17. The method of claim 16, further comprising: controlling a movement of the power door to a predetermined opening distance when the at least one door of the vehicle is not locked or the vehicle security is not set.

18. The method of claim 17, wherein the predetermined opening distance is selected by identifying a key fob in proximity to the vehicle.

19. The method of claim 16, wherein determining whether the vehicle security is set comprises determining if the at least one door is locked due to actuation of a key fob lock button or actuation of an internal universal door lock switch.

20. The method of claim 16, wherein the power door comprises at least one of a tailgate and a liftgate.

21. A method of controlling an automatic operation of a power door of a vehicle, comprising:

detecting an actuation of an interior switch by a user;

determining if a vehicle security is set after detecting the actuation of the interior switch;

prohibiting the automatic operation of the power door if the vehicle security is set;

permitting the automatic operation of the power door if the vehicle security is not set; and if the vehicle security is not set, using an audible alarm to notify a user that the power door is in an automatic mode of operation.

22. The method of claim 21, wherein determining if the vehicle security is set comprises determining if the at least one door is locked due to one of actuation of a key fob lock button and actuation of an internal universal door lock switch.

23. The method of claim 21, wherein the power door comprises at least one of a tailgate and a liftgate.

24. A system for controlling an operation of a power door of a vehicle, comprising:

a sensor for detecting an activation of an interior switch associated with the power door;

a motor controller configured to control a movement of the power door; and a processor configured to:

detect an actuation of an interior switch by a user;

upon detecting the actuation of the interior switch, determine whether at least one door of the vehicle is locked;

when the at least one door of the vehicle is locked, determine whether a vehicle security is set;

when the at least one door of the vehicle is locked and the vehicle security is set, prohibit the motor controller from moving the power door;

when the at least one door of the vehicle is not locked or the vehicle security is not set, permit the motor controller to move the power door; and when the at least one door of the vehicle is not locked or the vehicle security is not set, use an audible alarm to notify a user that the power door is in an automatic mode of operation.

25. The system of claim 24, wherein the processor is configured to determine whether the at least one door is locked due to actuation of a key fob lock button or actuation of an internal universal door lock switch.

26. The system of claim 24, wherein the power door comprises at least one of a tailgate and a liftgate.

* * * * *